United States Patent [19]

Roche

[11] Patent Number: 4,663,532

[45] Date of Patent: May 5, 1987

[54] APPARATUS FOR IRRADIATING MATERIAL BY AN ELECTRON BEAM

[75] Inventor: Michel Roche, Dijon, France

[73] Assignee: Commissariat a l'Energie Atomique, Paris, France

[21] Appl. No.: 803,975

[22] Filed: Dec. 3, 1985

[30] Foreign Application Priority Data

Dec. 14, 1984 [FR] France ................................ 84 19153

[51] Int. Cl.[4] ................................................ G01K 1/08

[52] U.S. Cl. ................................ 250/400; 250/396 R; 250/492.3; 250/437; 313/360.1; 313/361.1

[58] Field of Search .................. 250/396 R, 398, 400, 250/436, 437, 492.3; 313/360.1, 361.1, 341

[56] References Cited

U.S. PATENT DOCUMENTS

| | | | |
|---|---|---|---|
| 2,289,071 | 7/1942 | Ramo | 250/396 R |
| 2,313,018 | 3/1943 | Krause | 250/396 R |
| 2,452,893 | 11/1948 | Bachman | 250/396 R |
| 3,974,391 | 8/1976 | Offermann | 250/492.3 |
| 4,514,638 | 4/1985 | Lischke et al. | 250/398 |

*Primary Examiner*—Bruce C. Anderson
*Attorney, Agent, or Firm*—Oblon, Fisher, Spivak, McClelland & Maier

[57] ABSTRACT

The invention relates to an apparatus for irradiating material by an electron beam. The apparatus comprises guidance means for placing the material on the path of the beam, an electron gun provided in a tight enclosure having a shape with a symmetry or revolution with respect to an axis, an electron-emitting filament located in the axis of the enclosure, as well as a Wehnelt electrode surrounding the filament. It is provided with a first circular slot for concentrating electrons in the vicinity of the said slot and an electron accelerating electrode surrounding the Wehnelt electrode and having a second circular slot facing the first slot. The enclosure comprises a tightly closed circular window which is transparent to the electrons and which faces the two slots.

9 Claims, 5 Drawing Figures

APPARATUS FOR IRRADIATING MATERIAL BY AN ELECTRON BEAM

BACKGROUND OF THE INVENTION

The present invention relates to an apparatus for irradiating material by an electron beam. It applies to the irradiation of gases, liquids or solids. Gases are irradiated for chemical uses or for sterilization purposes. Liquids are also irradiated for chemical or food uses (sterilization of fruit juices, milk, water, etc.). Solids are irradiated for chemical uses (polymerization), medical uses (sterilization, food uses (irradiation of grain, fruit, potatoes, vegetables, etc.), genetic purposes (irradiation of seed, insects, etc.).

Various apparatuses are known for the irradiation of matter by an electron beam. One of these apparatuses supplies an electron beam in a plane passing through an exit window closed by a thin metal diaphragm. It belongs to an enclosure in which a vacuum has been formed and in which is located an electron gun, which emits a very flat, very long beam. This window can have a length of two metres for a width of a few centimeters. The displacement of the electrons must be perpendicular to the window surface, so as to traverse the same under optimum conditions.

It is possible to produce a planar electron beam from a punctiform electron beam which, as a result of a scanning system, is given an alternating linear movement in front of the window. The main disadvantage of an apparatus of this type is that of requiring the use of a scanning system and of limiting the utilization of electrons in a linear zone close to the window.

Of late electron accelerators have been designed, which make it possible to directly accelerate the electrons of a laminar beam by using either electron guns in which the electron source is constituted by a very long filament, or plasma devices in which the electrons are obtained by secondary emission from ions emanating from a filamentary anode.

These different apparatuses making it possible to obtain a planar electron beam suffer from several disadvantages. In the scanning apparatus, for the purpose of limiting the incidence of the electrons at the ends of the window, it is necessary to construct equipment having prohibitive overall dimensions. In apparatuses using electron guns and having a very long filament, it is difficult to replace the emissive filaments when they have deteriorated. In plasma devices it is difficult to obtain a uniform beam and consequently a uniform irradiation. These devices are also complex and costly.

SUMMARY OF THE INVENTION

The present invention aims at obviating these disadvantages and more particularly at providing an apparatus for irradiating material by an electron beam, in which it is possible to use a small size emissive filament, which is easy to change, the beam being planar and propagating about an axis over 360°, thus facilitating the use of the apparatus for industrial purposes. This very simple apparatus is consequently also inexpensive.

The present invention therefore specifically relates to an apparatus for irradiating material by an electron beam incorporating an electron gun and guidance means for placing the material on the path of the beam, wherein the electron gun comprises, in a tight enclosure having a shape with a symmetry of revolution relative to an axis, an emissive electron filament located in the axis of the enclosure and coaxially a Wehnelt electrode surrounding the filament and having a symmetry of revolution with respect to said axis and having a first circular slot for concentrating electrons in the vicinity of the plane perpendicular to the axis and passing through the first slot positioned facing the filament, at least one electron accelerating electrode surrounding the Wehnelt electrode and having a symmetry of revolution relative to said axis and having a second circular slot facing the first slot, the enclosure having a circular window, which is tightly closed and transparent to electrons, said window facing the two slots, the guidance means placing the material to be irradiated around the window.

According to another feature, the Wehnelt electrode comprises two truncated cones, each having a circular large base and a circular small base perpendicular to the axis, the respective small bases of the two truncated cones facing one another and being spaced to form the first slot, the truncated cones having recesses facing and in the vicinity of the first slot and containing said filament.

According to another characteristic, the window is closed by a metal sheet having a channel or trough shape penetrating towards the inside of the enclosure.

According to another feature, the first slot is surrounded by a circular grid on the circumference of the small bases of each of the two cones.

According to another feature, the guidance means incorporate an annular hollow sheath with two concentric walls surrounding said window, the material to be irradiated circulating in said sheath.

According to another feature, one of the sheath walls is partly constituted by the outer surface of the tight enclosure and by the sheet closing the window.

According to another feature, the guidance means have a funnel surrounding the gun and in which circulates the material to be irradiated.

According to another feature, the guidance means have a system for displacing the material to be irradiated, in order to make it circulate in front of the said window.

According to another feature, the material to be irradiated is in the form of a belt or tape wound to form a reel having the width of said belt or tape, the guidance means incorporating means for unwinding the tape by making it circulate in the direction of its length and so that it forms a sleeve round the window, by folding it in the direction of its width.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
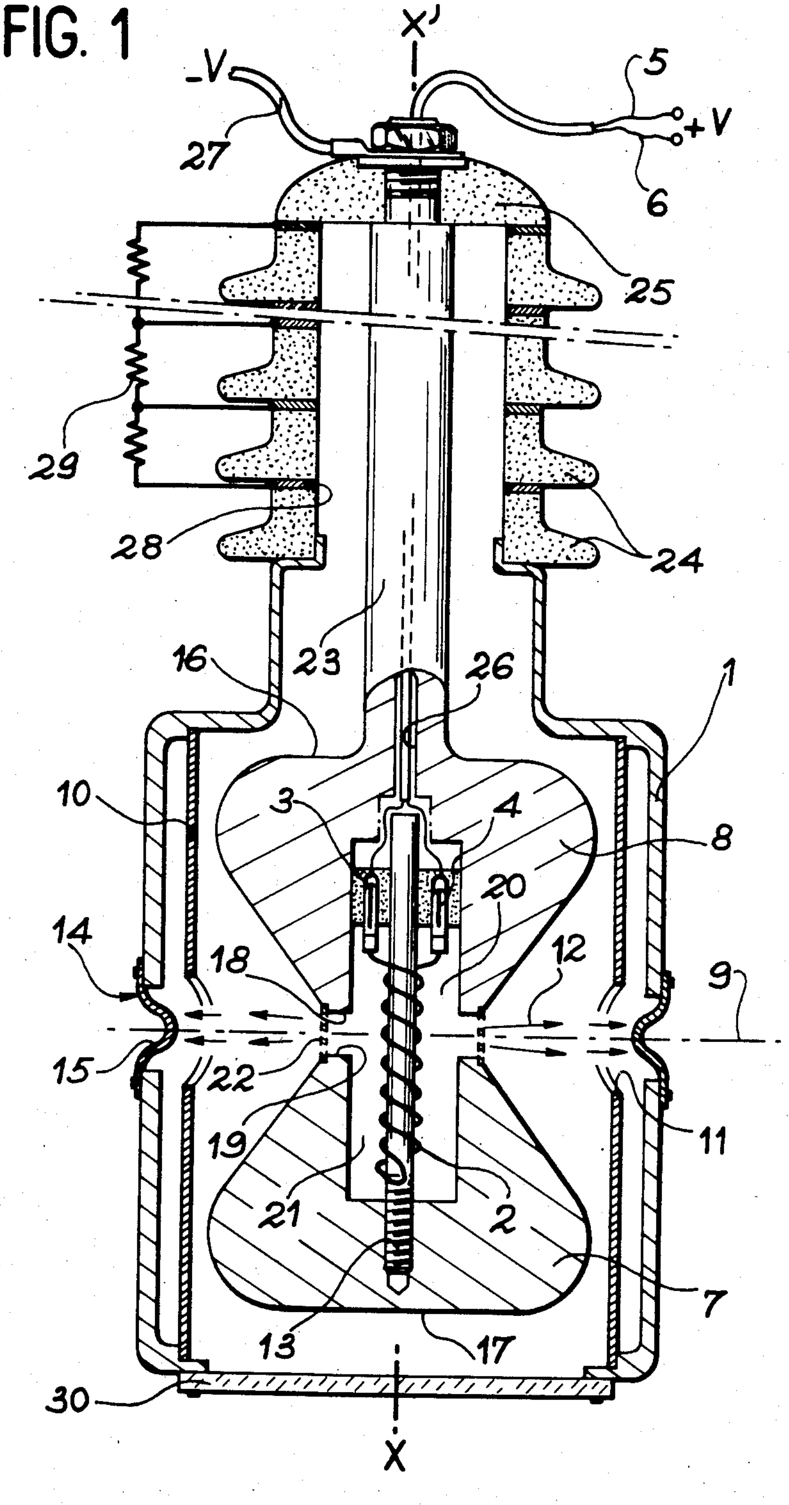
FIG. 1 diagrammatically and in longitudinal section, an irradiation apparatus according to the invention.

FIG. 1 shows diagrammatically and in longitudinal section an irradiation apparatus according to the invention. This apparatus comprises an electron gun located in a tight enclosure 1 and guidance means for placing the material to be irradiated on the path of the electron beam. The guidance means are not shown in the drawing and will be described hereinafter. The enclosure 1 has a symmetry of revolution with respect to an axis X'X. Throughout the remainder of the description, the term symmetry of revolution will be understood to mean the surface obtained by rotating a curve or straight line around an axis.

Within the tight enclosure 1, the electron beam comprises an emissive filament 2 connected by plug-in connectors 3, 4 and by conductor wires 5, 6 to a negative high voltage −V'. This emissive filament is in the form of a coil, whose axis corresponds to axis X'X of the enclosure. Coaxially, the gun also comprises a Wehnelt electrode in two parts 7, 8, which surround the filament 2 and which has a symmetry of revolution with respect to axis X'X. This Wehnelt electrode has a first circular slot 9 making it possible to concentrate the electrons in the vicinity of a plane P perpendicular to the axis X'X and passing through slot 9. The latter faces filament 2. The concentration of the electrons is produced by the electrical field appearing in the slot when Wehnelt electrode 7 is supplied by a negative high voltage −V. The absolute value of voltage −V is slightly higher than the absolute value of the voltage −V' supplying the filament. The apparatus also comprises an electron accelerating electrode 10, which surrounds the Wehnelt electrode 7, 8 and also has a symmetry of revolution with respect to enclosure axis X'X. The potential of said electrode can be equal to that of the enclosure. In practice, this potential is that of a reference electric earth. The accelerating electrode 10 has a second circular slot 11 facing the first slot 9. The electron beam emmited by the filament in the vicinity of plane P is shown at 12. The two parts 7, 8 of the Wehnelt electrode are joined e.g. by a conductive threaded rod 13, integral with Wehnelt electrode part 8.

Finally, enclosure 1 is provided with a circular window 14, which is tightly closed by a metal sheet having a trough-shaped section, penetrating towards the interior of the enclosure. This window faces slots 9, 11 and is transparent to the electrons. The guidance means, which are not shown in this drawing, place the material to be irradiated around the window.

The two parts 7, 8 of the Wehnelt electrode form two truncated cones, each having a large base and a small base. The large bases of these truncated cones are respectively designated 16, 17, while the two small bases are respectively designated 18, 19. The small bases 18, 19 of the truncated cones face one another and are spaced so as to form the first slot 9. These two truncated cones are respectively provided with recesses 20, 21, which face one another, in the vicinity of the first slot 9. These recesses contain the emissive filament 2. In an embodiment of the apparatus, the first slot 9 can be surrounded by a circular grid 22 on the circumference of the small bases 18, 19 of each of the two cones.

The two wehnelt electrode parts 7, 8 are connected by the threaded rod 13 and by a rod 23 to the voltage supply −V, across elements such as 24, 25 of an insulator. The connecting wires 5, 6 of the filament pass through a bore 26 in rod 23 and then through insulator element 25 and are then connected to the voltage supply −V'. In view of the vacuum within enclosure 1, the bushings of conductors 5, 6 and 27 are tight. In par se known manner, the insulator elements 24 are separated by conductive washers 28, connected by resistors 29 making it possible to make the different elements of the insulator equipotential. The tight enclosure 1 can be closed by a tight cover 30. This detachable cover gives access to the interior of the enclosure, so that e.g. filament 2 can be replaced in the case of deterioration.

FIGS. 2 to 5 show different embodiments making it possible to place the material to be irradiated on the path of the electron beam produced in a plane P passing through window 14. The electron gun is designated by reference letter C. The enclosure containing the various gun components is designated 1 and the reference window 14.

Figure 2:
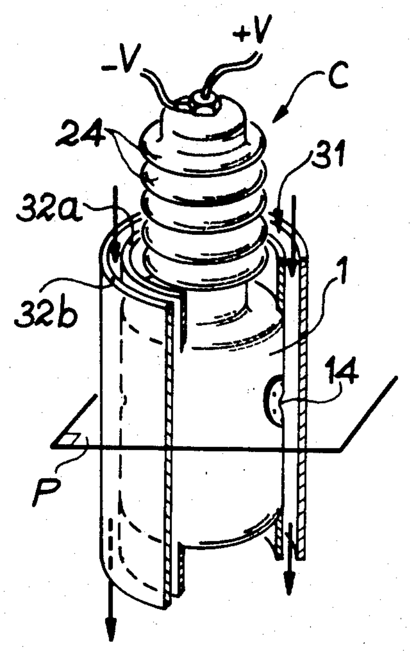
FIG. 2 diagrammatically a first embodiment of the means for guiding the material to be irradiated.

In the first embodiment of the guidance means shown in FIG. 2, said means comprise a hollow annular sheath 31 with two concentric walls 32*a*, 32*b*. The material to be irradiated circulates between these two walls, as indicated by the arrows in the drawing. This material can be a liquid, a gas, or even a solid in powder form. The inner wall 32*a* of the sheath 31 can at least partly be constituted by the outer surface of the tight enclosure 1 and by the metal sheet closing window 14. Under these conditions, the materials to be irradiated directly receive the electron beam emitted in plane P.

Figure 3:
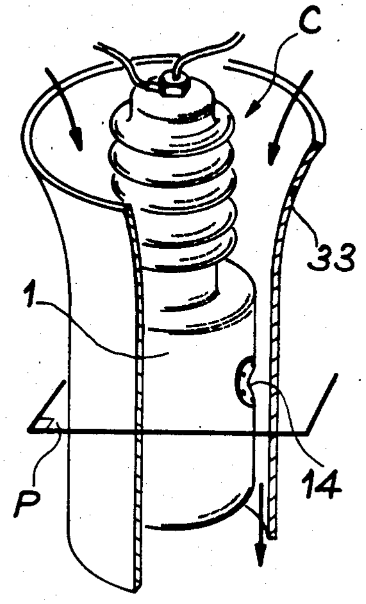
FIG. 3 diagrammatically a second embodiment of the guidance means.

In the second embodiment shown in FIG. 3, the electron gun C is placed in a funnel 33, whereof the upper part e.g. has a bell-shape, aiding the reception of the materials to be irradiated. These materials are in direct contact with the metal sheet closing window 14 of enclosure 1.

In these two embodiments of the guidance means, the pressure outside the enclosure is generally close to atmospheric pressure. If A is atmospheric pressure, $\rho$ the radius of curvature of the window and P the pressure of the material circulating in the vicinity of the window, it is possible to write $P=A/\rho$, with $A=\sigma\ \epsilon$. In the latter relation, $\sigma$ designates the ultimate tensile strength of the metal forming the window and $\epsilon$ is the thickness of the metal sheet closing the window.

If the pressure P of the material to be irradiated is a few bars and if the material is formed from a 20 micron thick titanium sheet, the radius of curvature $\rho$ of said window does not exceed a few centimeters.

Figure 4:
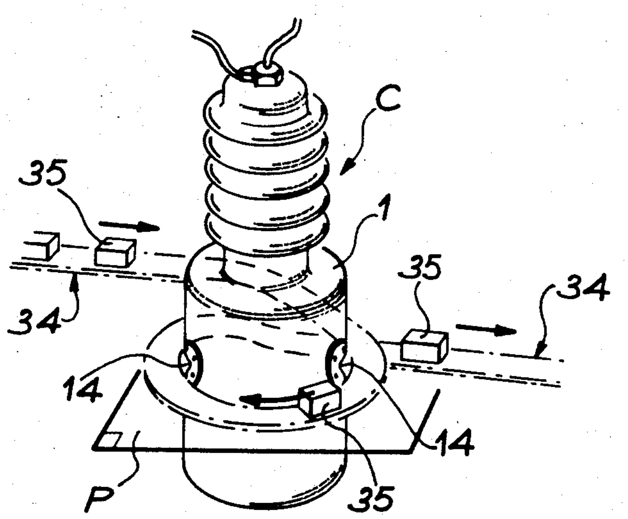
FIG. 4 diagrammatically a third embodiment of the means for guiding the material to be irradiated.

FIG. 4 shows a third embodiment of the means for guiding the material to be irradiated. In this case the guidance means are constituted by a system 34 making it possible to displace the material to be irradiated, so as to make it circulate in front of window 14. If objects 35 are to be irradiated, said guidance means are e.g. constituted by a conveyor or chain.

Figure 5:
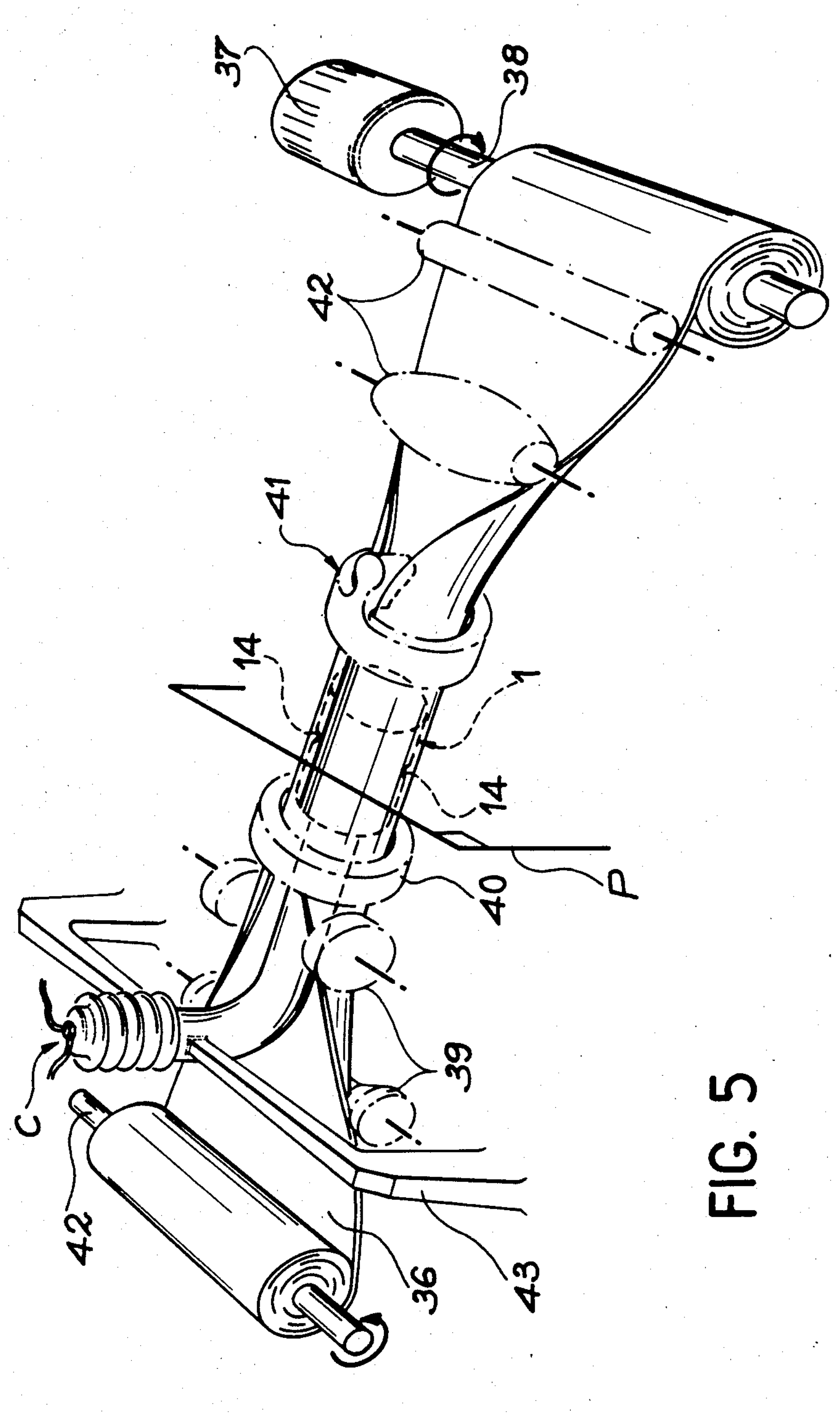
FIG. 5 diagrammatically a fourth embodiment of the guidance means.

Finally, FIG. 5 shows a fourth embodiment of the means for guiding the material to be irradiated. In this embodiment, the material to be irradiated is in the form of a belt or tape 36, wound to form a reel with the width of the belt or tape. In this case the guidance means incorporate a motor 37 driving a spindle 38, on to which is wound the tape 36 following its irradiation by electron guns C. The tape circulates in the lengthwise direction, as indicated by the arrows. The guidance means have guides 39, 40, 41 and 42 enabling the tape to form a sleeve around window 14 and enclosure 1, by folding it round said enclosure in the widthwise direction of the tape. Thus, the tape is unwound round spindle 42 and is wound round spindle 38. Member 43 holds the apparatus in place.

What is claimed is:

1. An apparatus for irradiating material by an electron beam incorporating an electron gun and guidance means for placing the material on the path of the beam, wherein the electron gun comprises, in a tight enclosure having a shape with a symmetry of revolution relative to an axis, an emissive electron filament located in the axis of the enclosure and coaxially a Wehnelt electrode surrounding the filament and having a symmetry of revolution with respect to said axis and having a first circular slot for concentrating electrons in the vicinity of the plane perpendicular to the axis and passing through the first slot positioned facing the filament, at least one electron accelerating electrode surrounding the Wehnelt electrode and having a symmetry of revolution relative to said axis and having a second circular slot facing the first slot, the enclosure having a circular window, which is tightly closed and transparent to electrons, said window facing the two slots, the guidance means placing the material to be irradiated around the window.

2. An apparatus according to claim 1, wherein the Wehnelt electrode comprises two truncated cones, each having a circular large base and a circular small base perpendicular to the axis, the respective small bases of the two truncated cones facing one another and being spaced to form the first slot, the truncated cones having recesses facing and in the vicinity of the first slot and containing said filament.

3. An apparatus according to claim 2, wherein the said window is closed by a metal sheet having a trough-like section and penetrating towards the interior of the enclosure.

4. An apparatus according to claim 2, wherein the first slot is surrounded by a circular grid on the circumference of the small bases of each of the two cones.

5. An apparatus according to any one of the claims 1 to 4, wherein the guidance means incorporate an annular hollow sheath with two concentric walls surrounding said window, the material to be irradiated circulating in said sheath.

6. An apparatus according to claim 5, wherein, one of the sheath walls is partly constituted by the outer surface of the tight enclosure and by the sheet closing the window.

7. An apparatus according to any one of the claims 1 to 4, wherein, the guidance means incorporate a funnel surrounding the gun and in which the material to be irradiated circulates.

8. An apparatus according to one of the claims 1 to 4, wherein, the guidance means incorporate a system for displacing the material to be irradiated, so as to make it circulate in front of the window.

9. An apparatus according to any one of the claims 1 to 4, wherein, material to be irradiated is in the form of a belt or tape wound to form a reel having the width of said belt or tape, the guidance means incorporating means for unwinding the tape by making it circulate in the direction of its length and so that it forms a sleeve round the window, by folding it in the direction of its width.

* * * * *